(12) United States Patent
Leon et al.

(10) Patent No.: US 11,140,278 B2
(45) Date of Patent: Oct. 5, 2021

(54) POSTAGE PRINTER

(71) Applicant: Stamps.com Inc., El Segundo, CA (US)

(72) Inventors: J P Leon, Tucson, AZ (US); John R. Clem, Manhattan Beach, CA (US)

(73) Assignee: Stamps.com Inc., El Segundo, CA (US)

( * ) Notice: Subject to any disclaimer, the term of this patent is extended or adjusted under 35 U.S.C. 154(b) by 1426 days.

(21) Appl. No.: 13/924,337

(22) Filed: Jun. 21, 2013

(65) Prior Publication Data

US 2013/0278949 A1    Oct. 24, 2013

Related U.S. Application Data

(63) Continuation of application No. 11/616,327, filed on Dec. 27, 2006, now Pat. No. 8,510,233.

(51) Int. Cl.
*H04N 1/00* (2006.01)
*G07B 17/00* (2006.01)

(52) U.S. Cl.
CPC ... *H04N 1/00204* (2013.01); *G07B 17/00024* (2013.01); *G07B 2017/0054* (2013.01); *G07B 2017/00064* (2013.01); *G07B 2017/00701* (2013.01)

(58) Field of Classification Search
CPC combination set(s) only.
See application file for complete search history.

(56) References Cited

U.S. PATENT DOCUMENTS

| | | |
|---|---|---|
| 3,867,882 A | 2/1975 | Ahlgren et al. |
| 4,447,890 A | 5/1984 | Duwel et al. |
| 4,685,702 A | 8/1987 | Kazuharu |
| 4,725,718 A | 2/1988 | Sansone et al. |
| 4,743,747 A | 5/1988 | Fougere et al. |
| 4,757,537 A | 7/1988 | Edelmann et al. |
| 4,775,246 A | 10/1988 | Edelmann et al. |
| 4,802,218 A | 1/1989 | Wright et al. |
| 4,812,994 A | 3/1989 | Taylor et al. |
| 4,831,555 A | 5/1989 | Sansone et al. |
| 4,837,702 A | 6/1989 | Obrea |
| 4,853,865 A | 8/1989 | Sansone et al. |

(Continued)

FOREIGN PATENT DOCUMENTS

| | | |
|---|---|---|
| EP | 0360225 A2 | 3/1990 |
| EP | 0576113 A2 | 12/1993 |

(Continued)

OTHER PUBLICATIONS

Neopost unveils latest self-service postage kiosk and the high-powered IJ105 digital mailing machine at NPF show. (Apr. 19, 2002). Business Wire Retrieved from https://dialog.proquest.com/professional/docview/1072384873?accountid=131444 (Year: 2002).*

(Continued)

*Primary Examiner* — Michael P Harrington
(74) *Attorney, Agent, or Firm* — Norton Rose Fulbright US LLP

(57) ABSTRACT

Embodiments of the invention involve an integrated thermal printer with a scale that is connected to a computer. The computer is connected to a web server that is authorized by a government postal agency, e.g. the USPS, to issue postage.

27 Claims, 1 Drawing Sheet

(56) References Cited

U.S. PATENT DOCUMENTS

| | | |
|---|---|---|
| 4,900,903 A | 2/1990 | Wright et al. |
| 4,900,904 A | 2/1990 | Wright et al. |
| 4,908,770 A | 3/1990 | Breault et al. |
| 4,933,849 A | 6/1990 | Connell et al. |
| 4,935,961 A | 6/1990 | Gargiulo et al. |
| 4,949,381 A | 8/1990 | Pastor |
| 4,980,542 A | 12/1990 | Jackson et al. |
| 5,048,085 A | 9/1991 | Abraham et al. |
| 5,058,008 A | 10/1991 | Schumacher |
| 5,075,865 A | 12/1991 | Kawamura et al. |
| 5,111,030 A | 5/1992 | Brasington et al. |
| 5,142,577 A | 8/1992 | Pastor |
| 5,181,245 A | 1/1993 | Jones |
| 5,308,173 A | 5/1994 | Amano et al. |
| 5,319,562 A | 6/1994 | Whitehouse |
| 5,325,519 A | 6/1994 | Long et al. |
| 5,341,505 A | 8/1994 | Whitehouse |
| 5,377,268 A | 12/1994 | Hunter |
| 5,384,886 A | 1/1995 | Rourke |
| 5,390,251 A | 2/1995 | Pastor et al. |
| 5,448,641 A | 9/1995 | Pintsov et al. |
| 5,454,038 A | 9/1995 | Cordery et al. |
| 5,471,925 A | 12/1995 | Heinrich et al. |
| 5,561,795 A | 10/1996 | Sarkar |
| 5,570,465 A | 10/1996 | Tsakanikas |
| 5,598,477 A | 1/1997 | Berson |
| 5,600,562 A | 2/1997 | Guenther |
| 5,621,797 A | 4/1997 | Rosen |
| 5,655,023 A | 8/1997 | Cordery et al. |
| 5,659,616 A | 8/1997 | Sudia |
| 5,666,421 A | 9/1997 | Pastor et al. |
| 5,668,897 A | 9/1997 | Stolfo |
| 5,671,146 A | 9/1997 | Windel et al. |
| 5,680,629 A | 10/1997 | Slayden et al. |
| 5,684,951 A | 11/1997 | Goldman et al. |
| 5,729,734 A | 3/1998 | Parker et al. |
| 5,742,683 A | 4/1998 | Lee et al. |
| 5,768,132 A | 6/1998 | Cordery et al. |
| 5,781,438 A | 7/1998 | Lee et al. |
| 5,781,634 A | 7/1998 | Cordery et al. |
| 5,793,867 A | 8/1998 | Cordery et al. |
| 5,796,841 A | 8/1998 | Cordery et al. |
| 5,801,944 A | 9/1998 | Kara |
| 5,812,990 A | 9/1998 | Ryan, Jr. et al. |
| 5,812,991 A | 9/1998 | Kara |
| 5,819,240 A | 10/1998 | Kara |
| 5,822,739 A | 10/1998 | Kara |
| 5,825,893 A | 10/1998 | Kara |
| 5,867,578 A | 2/1999 | Brickell et al. |
| 5,917,924 A | 6/1999 | Herbert |
| 5,918,234 A | 6/1999 | Shah et al. |
| 5,930,796 A | 7/1999 | Pierce et al. |
| 5,940,383 A | 8/1999 | Willkie |
| 5,953,427 A | 9/1999 | Cordery et al. |
| 5,956,404 A | 9/1999 | Schneier et al. |
| 5,978,484 A | 11/1999 | Apperson et al. |
| 5,983,227 A | 11/1999 | Nazem et al. |
| 5,987,441 A | 11/1999 | Lee et al. |
| 5,988,897 A | 11/1999 | Pierce et al. |
| 6,005,945 A | 12/1999 | Whitehouse |
| 6,009,417 A | 12/1999 | Brookner et al. |
| 6,010,156 A | 1/2000 | Block |
| 6,026,385 A | 2/2000 | Harvey et al. |
| 6,058,384 A | 5/2000 | Pierce et al. |
| 6,061,671 A | 5/2000 | Baker et al. |
| 6,064,993 A | 5/2000 | Ryan, Jr. |
| 6,070,150 A | 5/2000 | Remington et al. |
| 6,081,810 A | 6/2000 | Rosenzweig et al. |
| 6,098,057 A * | 8/2000 | Dlugos ............ G07B 17/00467 705/407 |
| 6,098,058 A | 8/2000 | Gravell et al. |
| 6,105,063 A | 8/2000 | Hayes, Jr. |
| 6,134,582 A | 10/2000 | Kennedy |
| 6,151,591 A | 11/2000 | Pierce et al. |
| 6,161,139 A | 12/2000 | Win et al. |
| 6,164,528 A | 12/2000 | Hills et al. |
| 6,208,980 B1 | 3/2001 | Kara |
| 6,223,166 B1 | 4/2001 | Kay |
| 6,226,752 B1 | 5/2001 | Gupta et al. |
| 6,233,565 B1 | 5/2001 | Lewis et al. |
| 6,233,568 B1 | 5/2001 | Kara |
| 6,249,777 B1 | 6/2001 | Kara et al. |
| 6,275,824 B1 | 8/2001 | O'Flaherty et al. |
| 6,286,098 B1 | 9/2001 | Wenig et al. |
| 6,324,523 B1 | 11/2001 | Killeen, Jr. et al. |
| 6,341,274 B1 | 1/2002 | Leon |
| 6,353,926 B1 | 3/2002 | Parthesarathy et al. |
| 6,367,013 B1 | 4/2002 | Bisbee et al. |
| 6,381,589 B1 | 4/2002 | Leon |
| 6,385,654 B1 | 5/2002 | Tanaka |
| 6,385,731 B2 | 5/2002 | Ananda |
| 6,408,286 B1 | 6/2002 | Heiden |
| 6,415,983 B1 | 7/2002 | Ulvr et al. |
| 6,424,954 B1 | 7/2002 | Leon |
| 6,427,021 B1 | 7/2002 | Fischer et al. |
| 6,466,921 B1 | 10/2002 | Cordery et al. |
| 6,473,743 B1 | 10/2002 | Ryan, Jr. |
| 6,567,794 B1 | 5/2003 | Cordery et al. |
| 6,571,223 B1 | 5/2003 | Vaghi |
| 6,636,983 B1 | 10/2003 | Levi |
| 7,055,746 B2 | 6/2006 | MacKay et al. |
| 7,120,611 B1 | 10/2006 | Vaghi |
| 7,149,726 B1 | 12/2006 | Lingle et al. |
| 7,190,473 B1 | 3/2007 | Cook et al. |
| 7,194,957 B1 | 3/2007 | Leon et al. |
| 7,233,930 B1 | 6/2007 | Ryan, Jr. |
| 7,243,842 B1 | 7/2007 | Leon et al. |
| 2001/0024586 A1 | 9/2001 | Day et al. |
| 2001/0034716 A1 | 10/2001 | Goodwin |
| 2001/0037320 A1 | 11/2001 | Allport et al. |
| 2001/0044783 A1 | 11/2001 | Weisberg et al. |
| 2001/0055388 A1 | 12/2001 | Kaliski |
| 2002/0023057 A1 | 2/2002 | Goodwin et al. |
| 2002/0040353 A1 | 4/2002 | Brown et al. |
| 2002/0046193 A1 | 4/2002 | Bator et al. |
| 2002/0095383 A1 | 7/2002 | Mengin et al. |
| 2003/0024745 A1 | 2/2003 | Huitt et al. |
| 2003/0035138 A1 * | 2/2003 | Schilling ............ G06Q 10/087 358/1.15 |
| 2003/0078893 A1 | 4/2003 | Shah et al. |
| 2003/0130954 A1 | 7/2003 | Carr et al. |
| 2003/0167241 A1 * | 9/2003 | Gilham ............ G07B 17/00435 705/405 |
| 2003/0217018 A1 * | 11/2003 | Groff ............ G06Q 30/06 705/404 |
| 2004/0015453 A1 | 1/2004 | Youngblood et al. |
| 2005/0131844 A1 | 6/2005 | Ryan et al. |
| 2005/0278266 A1 | 12/2005 | Ogg et al. |
| 2006/0111969 A1 | 5/2006 | Chrosny et al. |
| 2007/0005518 A1 * | 1/2007 | Beckstrom ....... G07B 17/00314 705/402 |

FOREIGN PATENT DOCUMENTS

| | | |
|---|---|---|
| EP | 0604146 A2 | 6/1994 |
| EP | 0604148 A2 | 6/1994 |
| EP | 0647925 A2 | 4/1995 |
| EP | 0840258 A2 | 5/1998 |
| EP | 0854448 A2 | 7/1998 |
| EP | 0892367 A2 | 1/1999 |
| EP | 0927958 A2 | 7/1999 |
| EP | 0927963 A2 | 7/1999 |
| EP | 0948158 A2 | 10/1999 |
| GB | 2318486 A | 4/1998 |
| WO | WO-9427258 A1 | 11/1994 |
| WO | WO-9813790 A1 | 4/1998 |
| WO | WO-98/57302 A1 | 12/1998 |
| WO | WO-98/57460 A1 | 12/1998 |
| WO | WO-9918514 A1 | 4/1999 |
| WO | WO-0019382 | 4/2000 |
| WO | WO-0070503 | 11/2000 |

(56) References Cited

FOREIGN PATENT DOCUMENTS

| WO | WO 2001037108 A1 | 5/2001 |
|---|---|---|
| WO | WO-0150227 A1 | 7/2001 |

OTHER PUBLICATIONS

Breen, C. (2000). Simply postage. Macworld, 17(5), 54. Retrieved from https://dialog.proquest.com/professional/docview/1094000114?accountid=131444 (Year: 2000).*

"Cryptographic Module for Secure Processing of Value-Bearing Items," U.S. Appl. No. 09/688,456, filed Oct. 16, 2000.

United States Postal Service, "Information Based Indicia Program Postal Security Device Specification," Jun. 13, 1996, 41 pages.

Pastor, Jose; "CRYPTOPOST™—A Cryptographic Application to Mail Processing," Journal of Cryptology, vol. 3, No. 2, 1991, 11 pages.

Ratcliffe, Mitch, "Ever feel you're being watched? You will." Digital Media; May 16, 1994; v3, n12, 3 pages.

Tygar, J.D.et al. "Cryptography: It's Not Just for Electronic Mail Anymore," School of Computer Science, Carnegie Mellon University, Pittsburg, PA, Mar. 1, 1993, 23 pages.

Tygar, J.D. et al. "Dyad: A System for Using Physically Secure Coprocessors," School of Computer Science, Carnegie Mellon University, Pittsburg, PA, May 4, 1991, 41 pages.

U.S. Appl. No. 09/585,025 to Lingle, filed Jun. 1, 2000, "Online Value Bearing Item Printing," 125 pages.

U.S. Appl. No. 09/688,451 to Ogg et al., filed Oct. 16, 2000, entitled "Auditing Method and System for an On-Line Value-Bearing Item Printing System," 105 pages.

U.S. Appl. No. 09/688,452 to Ogg et al., filed Oct. 16, 2000, entitled "Role Assignments in a Cryptographic Module for Secure Processing of Value-Bearing Items," 105 pages.

The United States Postal Service (USPS); Information-Based Indicia Program (IBIP): Performance Criteria for Information-Based Indicia and Security Architecture for Closed IBI Postage Metering Systems (PCIBI-C); Jan. 12, 1999; 49 pages.

The United States Postal Service (USPS); Information-Based Indicia Program (IBIP); Performance Criteria for Information-Based Indicia and Security Architecture for Open IBI Postage Evidencing Systems (PCIBI-O); Jun. 25, 1999; 76 pages.

The United States Postal Service (USPS) Engineering Center, Information-Based Indicia Program (IBIP) Indicium Specification, Jun. 13, 1996, 22 pages.

U.S. Appl. No. 09/690,066 to Ogg et al., filed Oct. 16, 2000, entitled "Cryptographic Module for Secure Processing of Value-Bearing Items," 121 pages.

U.S. Appl. No. 09/690,083 to Ogg et al., filed Oct. 16, 2000, entitled "Cryptographic Module for Secure Processing of Value-Bearing Items," 109 pages.

U.S. Appl. No. 09/690,243 to Engelberg et al., filed Oct. 17, 2000, entitled "Method and Apparatus for On-Line Value-Bearing Item System," 66 pages.

U.S. Appl. No. 09/690,796 to Ogg, filed Oct. 17, 2000, entitled "Secure and Recoverable Database for On-Line Value-Bearing Item System," 71 pages.

U.S. Appl. No. 09/692,746 to Bussell, filed Oct. 18, 2000, entitled "Method and Apparatus for Digitally Signing an Advertisement Area Next to a Value-Bearing Item," 61 pages.

U.S. Appl. No. 09/692,829 to Lingle et al., filed Oct. 18, 2000, entitled "Postal System Intranet and Commerce Processing for On-Line Value-Bearing System," 179 pages.

U.S. Appl. No. 09/788,069 to Weisberg et al., filed Feb. 16, 2001, entitled "On-Line Value-Bearing Indicium Printing Using USA," 43 pages.

U.S. Appl. No. 10/083,236 to Ogg et al., filed Feb. 26, 2002, entitled "Secured Centralized Public Key Infrastructure," 101 pages.

* cited by examiner

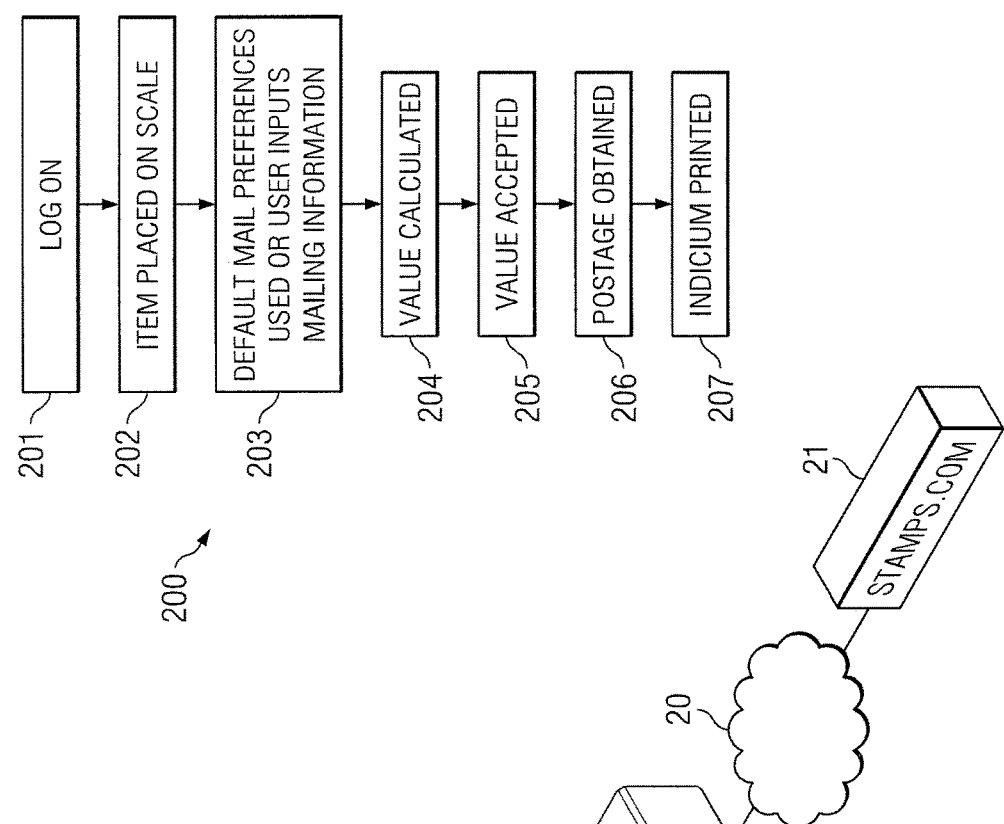
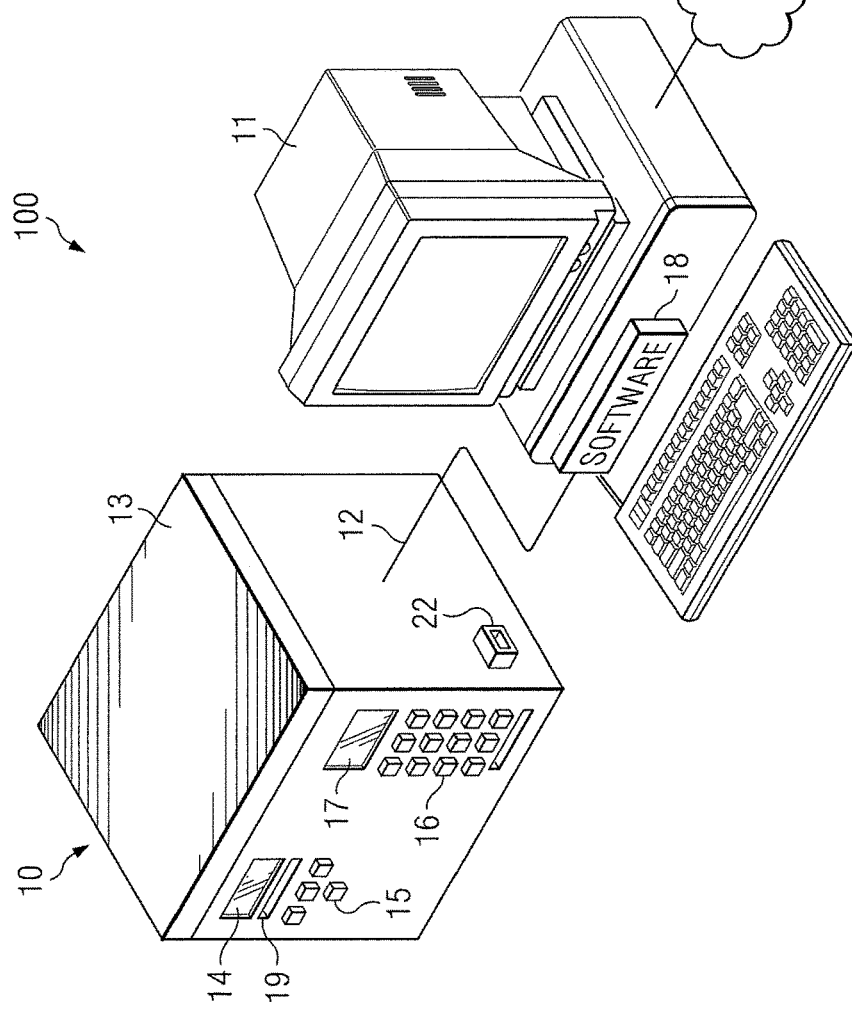

POSTAGE PRINTER

CROSS-REFERENCE TO RELATED APPLICATIONS

The present application is a continuation of co-pending, commonly assigned, patent application Ser. No. 11/616,327 entitled "POSTAGE PRINTER," filed Dec. 27, 2006 and is related to co-pending and commonly assigned U.S. patent application Ser. No. 09/688,456 entitled "CRYPTOGRAPHIC MODULE FOR SECURE PROCESSING OF VALUE-BEARING ITEMS," filed Oct. 16, 2000, the disclosures of which are hereby incorporated herein by reference.

TECHNICAL FIELD

This application relates in general to printers and in specific to printers for printing postage indicia.

BACKGROUND OF THE INVENTION

Printers, including thermal printers, have been in widespread use for many years. Thermal Printers made by suppliers such as Dymo, Zebra, Seiko, Avery, and Brother have the ability to print any data feed. Typically, they do not provide any communication to outside software. In other words, the printers have their own proprietary software to print items sent as a print image. Thus, there is no communication from the printer back to the controller, e.g. a computer, as there is only communication from the controller to the printer.

Another type of postage indicia printer is a non-thermal printer that has an integrated scale. This type of printer is essentially a postage meter that prints a postage indicium. This type of printer system is dedicated to forming postage indicia for postal items.

A further type of postage indicia printer is also a non-thermal printer that comprises a computer connected to a printer. The computer is a general-purpose processor based computer that is operating under control of an instruction set that performs a postage meter function. A portion of the instruction set may be located on a postage security device (PSD) to authenticate the postage transaction.

BRIEF SUMMARY OF THE INVENTION

The present invention is directed to a system and method which comprises an integrated thermal printer with a scale that is connected to a computer. The computer is connected to a web server that is authorized by a government postal agency, e.g. the USPS, to issue postage. The value for an item to be mailed is calculated, and then sent to the authorized web server. The web server generates data that is used to form the postage indicium to be printed. The computer may form the postage indicium from the data, and provide the indicium to the printer for printing. To perform this transaction, information flows from the printer to the computer and then to the web server, and then back to the printer.

Embodiments of the invention have the security for the transaction built into the software residing on the computer and not in the printer.

Embodiments of the present invention allow for the printing USPS required data, including but not limited to a bar code, registration marks, facing indicator marks, etc., to be printed using a thermal printer.

Embodiments of the invention can be used to print an indicium on an envelope, or print an indicium onto a label, which may then be applied to an envelope.

Embodiments of the invention may use a non-thermal printer.

Embodiments of the invention may result in a cost savings from using a less expensive printing process.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 depicts an exemplary system according to embodiments of the invention; and FIG. 2 depicts an exemplary method of operation of the system of FIG. 1 according to embodiments of the invention.

DETAILED DESCRIPTION OF THE INVENTION

FIG. 1 depicts an exemplary system 100 of an embodiment of the invention. System 100 comprises an integrated thermal printer/scale 10 that is connected to a computer 11 via connection 12. The computer 11 may be a personal computer, laptop computer, or other computing device. The connection 12 may be a USB connection, an RF link, a fiber optic link, a wireless link, an infra-red link, a telephone network, a local (LAN) and/or a wide-area (WAN) network, an Ethernet network, and/or the Internet network. The computer 11 may be located within the same room as the printer 10 or in a different location.

The computer 11 includes software 18 that provides authentication for the postage being printed on the printer 10. The computer 11 may calculate the value of the postage from data provided by the printer 10 using a rating engine that has current rate tables for postage. The rate tables may be automatically updated via server 21. The computer may then send the value back to the printer for acceptance by a user at the printer. Alternatively, the printer may calculate the value of the postage, and then send the value to the computer 11. In any event, the computer then communicates with server 21 to handle the authentication of the postage indicium and obtain the postage credit for the value of the postage indicium. The computer is connected via network 20, e.g. the Internet, to a server 21 that is authorized by the USPS to generate postage. Note that the computer 11 may be connected to more than one printer 10, and handle operation of the printers. Interaction between the computer 11 and the server 21 and the operation of the computer 11 and the server 21 are described in more detail in U.S. Pat. No. 7,149,726, which is hereby incorporated herein by reference in its entirety, and U.S. patent application Ser. No. 09/688,456, which is hereby incorporated herein by reference in its entirety. For example, the postage indicium data may be generated by a cryptographic module within the server 21, and then sent back to the computer 11.

The integrated thermal printer/scale 10 includes a scale 13 that is used for weighing items to be mailed. The printer portion of printer 10 includes area 14 for loading one or more rolls of thermal paper to be used for printing postage indicium or indicia. The printer 10 includes a thermal print head that may print indicia and/or labels, depending upon the type of paper that is used. The print head may be a one inch print head that will print indicia only or a two inch print head that prints both indicia and labels. The printed indicium exits the printer through cover bar 19.

The printer 10 includes interface area, which may comprise one or more of button(s), slides, touch pad(s), and dial(s) to allow a user to input data and/or control the printer 10. For example, the interface area 15 may include a power button for powering the printer, a zero button to zero the scale, a feed button to align the paper roll, a hold scale button which will retain the weight value of the item to be mailed after the item has been removed from the scale, The printer 10 may also include a screen 17 to provide visual information to a user regarding information of the item to be mailed, and/or status of the printer. The screen 17 may be a small a LCD screen comprising two lines of twenty characters each, or the screen may be larger or smaller. The screen may display, for example, the weight of the item to be mailed, the desired mail class (e.g. first, priority, express, bulk, etc.) for the item, the type of item that is to be mailed (e.g. letter, flat, package, etc.), a quantity of items to be mailed, and the postage value for the item to be mailed.

The printer 10 may also comprise interface area 16, which may comprise one or more of button(s), slides, touch pad(s), and dial(s) to allow a user to input data and/or control the printer 10. For example, the interface area may include controls for allowing a user to select a desired mail class, a type of item, a quantity of items, and a print button that causes the printer to print the postage indicium or indicia for the item or items to be mailed. Using the interface area, the user may set a default condition, e.g. type is letter, the class is first, etc.

The printer 10 may also include one or more interfaces 22 to allow for peripheral devices to be attached to the printer. For example, one peripheral device may be a second scale. Thus, the second scale may be attached to the printer and used by the printer in weighing item(s) to be mailed. For example, the scale 13 may be a five pound scale capable of weighing items up to five pounds, while the second scale may have a larger capacity, e.g. 100 pounds. Other devices may include flash or RAM memory.

Note that the printer 10 may comprise one or more CPUs, each of which handles a particular function or set of functions of the printer. One of the CPUs may have a built-in A/D converter to allow for direct receipt of scale data. Different CPUs may also allow for future expandability and for conversion from a thermal print head to an ink jet print head. The CPUs may be any general purpose CPU, such as an Intel Pentium processor. However, the present invention is not restricted by the architecture of CPU as long as CPU supports the inventive operations as described herein. Various buses may connect the CPU(s) to memory, e.g. RAM access memory and/or ROM memory, to hold user and system data and programs. The buses may also connect the CPU(s) to one or more I/O cards which couple to user interface devices, such as the buttons 15, 16, the displays 14, 17, data ports (e.g. USB port(s), flash memory port(s)). The buses may also connect the CPU(s) to a printer controller, which controls the print head. The buses may also connect the CPU(s) to A/D converters, which allow data from one or more load cells or scales to be used by the CPU(s). The buses may also connect the CPU(s) to a communication interface, which allows a communication connection to be used by the CPU(s). The communication connection may be one or more of a telephone network, a local (LAN) and/or a wide-area (WAN) network, an Ethernet network, and/or the Internet network.

The printer 10 may print an image as a portion of the postage indicium. For example, an aesthetic picture, a personal picture, a company logo, a customized message, an effect, and/or a portion of a shipping label may be printed. Such images may be pre-loaded on the printer and/or downloaded to the printer from either the computer 11, the web server 21, or other location. The image may be edited at the printer 10 or at the computer 11. The images may be stored on internal RAM or on peripherally attached memory, e.g. flash memory. In one embodiment, a user may send an image from the computer 11 to the server 21 for approval; the image may only be printed after approval by the web server 21. Approval may be granted for images that are appropriate for use in the postage system.

FIG. 2 depicts an example of a method 200 of operation of the system 100 of FIG. 1. In 201, a user first logs on to the computer 11. This user may be the same user that will operate the printer 10 or a different user. In any event, after log on, the system 100 is ready for use. After log on, a user may place an item to be mailed on to the scale, 202. In 203, the user then inputs the mailing preferences for the item, such as item type, desired class, etc. The user may elect to use the default settings instead of making preference selections. Note 202 may be performed before during or after 203. Also note that 202 may not be performed, particularly when the weight is not critical to the item being mailed, e.g. postcards or simple first class letters.

In 204, the value for mailing the item is calculated. The value may be calculated based on the weight of the item and/or the preference information. The value may be calculated by the printer 10 or by the software 18 operating on the computer 11. If the value is calculated by the computer 11, the value may be sent to the printer 10 for display to the user. Note that the system may provide one or more values to the user. This may occur when the user does not make a selection for one or more preferences. For example, the user does not provide a preference for a mailing class. The system may then provide the user with different values based on the different classes. The user may then review each of the values and their associated mailing options and choose a desired value for the item.

In 205, the user accepts the value (or the selected value of a plurality of values) by engaging a print button, which initiates the printing of the indicium. In 206, the printer 10 communicates the acceptance to the computer 11, which then communicates with the USPS approved server 21 to obtain the postage for the transaction. The USPS approved server then debits an account or otherwise charges the appropriate entity for the postage value, generates the indicium data, and sends the indicium data with a digital signature back to the software 18. The software 18, using the indicium data, generates the postage indicium, and sends the postage indicium to the printer 10, which prints the indicium onto a medium.

In 207, the postage indicium or indicia, with the postage value, is printed by printer 10. The user then retrieves the label or indicium from the printer and attaches the label or indicium to the item(s) to be mailed.

Note that other embodiments may use non-thermal printers, such as a laser printer, a dot matrix printer, or an ink-jet printer. If a picture is desired to be printed along with the postage value, then an ink jet printer may be used.

The postage indicium that is printed by the printer 10 may be a simple indicium that includes a picture and a postage value.

The indicium may comprise a digital indicium, which may be an Information-Based Indicia (IBI). The IBI is a fully (or at least partially) computer-readable mark, e.g. a bar code, which comprises postal information that is digitally signed, which provides security to the postage system and reducing the risks of forgery, meter tampering, and unauthorized use. Each IBI may be unique and may include information such as one or more of a date, a time, a printer registration number, a user number, a source address, a destination address, mailing information (e.g. postage value, class, weight, size of the envelope, and/or number of pages, etc.), an IBI serial number, a digital signature, zip code, tracking information, and special services information (e.g. insurance, return receipt, certified mail, registered, express mail, or other services). In other words, the bar code may be dynamic in that it is based on the moment of creation and, thus each bar code will be different. The bar code may have a Data Matrix format, a two-dimensional bar code format, or a one-dimensional bar code format.

The printed indicium may comprise other elements along with the bar code, for example human readable information, and registration marks. The human readable information may be information desired by the USPS or by the mailer or shipper. Examples of human readable information include a company logo, a watermark, etc. The registration marks such as facing indication marks could be also printed, as well as other features that are not useful to a customer or aesthetically pleasing to a customer.

Postage may be purchased or added at either the printer 10 or the computer 11. A user may swipe a credit card at an attached credit card reader located at either the printer or the computer and enter a desired amount. The value may be tracked at the computer 11 and/or the server 21. The user may pre-authorize a credit account to be debited for a user-defined amount as needed.

Note that embodiments of the invention may be used to print the indicia for envelopes, or other shipping containers such as packages, boxes, cartons, tubes, etc. Embodiments of the invention may be used to print the indicia onto labels, which are then applied to envelopes, or other shipping containers such as packages, boxes, cartons, tubes, etc.

Note that any of the functions described herein may be implemented in hardware, software, and/or firmware, and/or any combination thereof. When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A postage printer comprising:
   an integrated printer and scale connected locally to a personal computer, wherein the integrated printer and scale includes:
   the scale configured to weigh items to be mailed;
   a label print stock area configured to house one or more rolls of label print stock;
   a print head configured to print postage indicia corresponding to the items to be mailed on label print stock of a roll of the one or more rolls of label print stock;
   a communication interface to locally communicatively couple the postage printer to the personal computer;
   a plurality of input buttons configured to accept input of preference information from a user, the preference information comprising parameters associated with a configuration of a postage indicium corresponding to a mail item of the mail items to be mailed;
   a processor configured to calculate a postage value for the postage indicium based on weight information associated with the mail item and the preference information, wherein the weight information is received from the scale and the preference information is indicated via the inputs received via one or more of the plurality of input buttons;
   a display configured to display information regarding the postage indicium to the user, the information regarding the postage indicium including at least the postage value calculated based on the weight information and the preference information,
   wherein the plurality of input buttons also includes a dedicated print button configured, in response to the user engaging the dedicated print button, to:
   accept the postage value of the postage indicium displayed by the display;

initiate transmission of the accepted postage value and the preference information to a web server via the communication interface and the personal computer; and print, via the print head, the postage indicium for the mail item based on information received from the web server in response to the transmission of the accepted postage value and the preference information to the web server.

2. The postage printer of claim 1, wherein the display is configured to display a plurality of calculated postage values for the postage indicium, and wherein the user selects the accepted postage value of the postage indicium using one or more input buttons of the plurality of input buttons.

3. The postage printer of claim 1, wherein the preference information includes mail class information for the mail item, and wherein the processor is configured to calculate the postage value for the mail item using the weight information and the mail class information.

4. The postage printer of claim 1, wherein the postage indicium comprises a user selected image.

5. The postage printer of claim 1, wherein the information received from the web server in response to the transmission of the accepted postage value and the preference information comprises postage indicium data, and wherein the postage indicium is printed based on the postage indicium data.

6. The postage printer of claim 1, further comprising:
a credit card reader configured to facilitate payment for the postage indicium.

7. The postage printer of claim 6, wherein the payment for the postage indicium comprises a purchase of postage credit, at least a portion of which is debited to provide payment of the postage value calculated for the postage indicium.

8. The postage printer of claim 1, further comprising a control input for zeroing the scale.

9. The postage printer of claim 1, wherein the communication interface is configured to communicatively couple the postage printer to the personal computer via a wireless communication link between the postage printer and the personal computer.

10. The postage printer of claim 1, further comprising a memory configured to store rate table information received, wherein the processor is configured to calculate the postage value for the postage indicium based on the weight information, the preference information, and the rate table information.

11. The postage printer of claim 1, wherein the preference information input via the plurality of input buttons comprises information that indicates a desired mail class for the mail item, a type of the mail item, a quantity of mail items to be mailed, and service information.

12. The postage printer of claim 1, wherein the communication interface comprises a universal serial bus (USB) interface configured to communicatively couple the postage printer to the personal computer via USB communication link.

13. The postage printer of claim 12, further comprising a memory configured to store rate table information received, wherein the processor is configured to calculate the postage value for the postage indicium based on the weight information, the preference information, and the rate table information.

14. A postage printer comprising:
an integrated printer and scale connected locally to a personal computer, wherein the integrated printer and scale includes:
the scale configured to weigh items to be mailed;
a label print stock area configured to house one or more rolls of label print stock;
a print head configured to print postage indicia corresponding to the items to be mailed on label print stock of a roll of the one or more rolls of label print stock;
a plurality of input buttons configured to accept input of preference information from a user, the preference information comprising parameters associated with a configuration of a postage indicium corresponding to a mail item of the mail items to be mailed, wherein the preference information includes a parameter that indicates mail class information for the mail item;
a processor configured to calculate a postage value for the postage indicium based on at least weight information associated with the mail item and the mail class information;
a display configured to display information regarding the postage indicium to the user, the information regarding the postage indicium including at least the postage value calculated based on the weight information and the mail class information; and
a communication interface to communicatively couple the postage printer to the personal computer via a communication link, wherein the plurality of input buttons includes a dedicated print button configured to initiate transmission of the configuration of the postage indicium to a web server via the communication link and the personal computer, the configuration of the postage indicium comprising the postage value calculated for the postage indicium and the preference information, and
wherein the print head is configured to print the postage indicium for the mail item based on information received from the web server via the communication interface and the personal computer in response to the transmission of the configuration of the postage indicium to the web server.

15. The postage printer of claim 14, wherein the processor is configured to calculate a plurality of postage values for the postage indicium, each postage value of the plurality of postage values is calculated based on a different mail class information, wherein the display is configured to display the plurality of postage values, and wherein the user selects a particular postage value of the plurality of postage values using one or more buttons of the plurality of buttons.

16. The postage printer of claim 14, wherein the information received from the web server in response to the transmission of the configuration of the postage indicium comprises postage indicium data, and wherein the postage indicium is printed based on the postage indicium data.

17. The postage printer of claim 14, wherein the label print stock comprises shipping label print stock.

18. The postage printer of claim 14, wherein the preference information includes a parameter that indicates item type information for the mail item, and wherein the processor is configured to calculate the postage value for the mail item based on the item type information.

19. The postage printer of claim 14, further comprising:
a credit card reader configured to facilitate payment for the postage indicium.

20. The postage printer of claim 19, wherein the payment for the postage indicia comprises purchase of postage credit, and wherein at least a portion of the postage credit is debited to provide payment of the postage value calculated for the postage indicium.

21. The postage printer of claim 14, further comprising a control input for zeroing the scale.

22. The postage printer of claim 14, further comprising a memory configured to store rate table information, wherein the processor is configured to calculate the postage value for the postage indicium based on the weight information, the preference information, and the rate table information.

23. The postage printer of claim 14, wherein the preference information input via the plurality of input buttons comprises information that indicates a desired mail class for the mail item, a type of the mail item, a quantity of mail items to be mailed, and service information.

24. The postage printer of claim 14, wherein the communication interface comprises a universal serial bus (USB) interface configured to communicatively couple the postage printer to the personal computer via USB communication link.

25. The postage printer of claim 24, further comprising a memory configured to store rate table information received, wherein the processor is configured to calculate the postage value for the postage indicium based on the weight information, the preference information, and the rate table information.

26. A postage printer comprising:
an integrated printer and scale connected locally to a personal computer, wherein the integrated printer and scale includes:
the scale configured to weigh items to be mailed;
a label print stock area configured to house one or more rolls of label print stock;
a print head configured to print postage indicia corresponding to the items to be mailed on label print stock of a roll of the one or more rolls of label print stock;
a plurality of input buttons configured to accept input of preference information from a user, the preference information comprising parameters associated with a configuration of a postage indicium corresponding to a mail item of the mail items to be mailed, wherein the preference information includes a parameter that indicates mail class information for the mail item;
a processor configured to calculate a postage value for the postage indicium based on at least weight information associated with the mail item and the mail class information;
a display configured to display information regarding the postage indicium to the user, the information regarding the postage indicium including at least the postage value calculated based on the weight information and the mail class information; and
a communication interface to communicatively couple the postage printer to the personal computer via a communication link, wherein the communication link comprises a wireless communication link between the postage printer and the personal computer, and wherein the plurality of input buttons includes a button configured to initiate transmission of the configuration of the postage indicium to a web server via the communication link and the personal computer, the configuration of the postage indicium comprising the postage value calculated for the postage indicium and the preference information, and
wherein the print head is configured to print the postage indicium for the mail item based on information received from the web server via the communication interface and the personal computer in response to the transmission of the configuration of the postage indicium to the web server.

27. A postage printer comprising:
an integrated printer and scale connected locally to a personal computer, wherein the integrated printer and scale includes:
the scale configured to weigh items to be mailed;
a label print stock area configured to house one or more rolls of label print stock;
a print head configured to print postage indicia corresponding to the items to be mailed on label print stock of a roll of the one or more rolls of label print stock;
a touch pad configured to accept input of preference information from a user, the preference information comprising parameters associated with a configuration of a postage indicium corresponding to a mail item of the mail items to be mailed, wherein the preference information includes a parameter that indicates mail class information for the mail item;
a processor configured to calculate a postage value for the postage indicium based on at least weight information associated with the mail item and the mail class information;
a display configured to display information regarding the postage indicium to the user, the information regarding the postage indicium including at least the postage value calculated based on the weight information and the mail class information; and
a communication interface to communicatively couple the postage printer to the personal computer via a communication link, wherein the communication link comprises a wireless communication link between the postage printer and the personal computer, and wherein the touch pad includes a button configured to initiate transmission of the configuration of the postage indicium to a web server via the communication link and the personal computer, the configuration of the postage indicium comprising the postage value calculated for the postage indicium and the preference information, and
wherein the print head is configured to print the postage indicium for the mail item based on information received from the web server via the communication interface and the personal computer in response to the transmission of the configuration of the postage indicium to the web server.

* * * * *